United States Patent
Demontis et al.

(10) Patent No.: US 8,162,399 B2
(45) Date of Patent: Apr. 24, 2012

(54) LUMBAR SUPPORT FOR A VEHICLE BACKREST

(75) Inventors: Salvatore Demontis, Orbassano (IT); Alberto Maria Merlo, Orbassano (IT); Giorgio Masoero, Orbassano (IT); Giovanni Boreanaz, Orbassano (IT)

(73) Assignee: C.R.F. Societa Consortile per Azioni (IT)

( * ) Notice: Subject to any disclaimer, the term of this patent is extended or adjusted under 35 U.S.C. 154(b) by 355 days.

(21) Appl. No.: 12/608,485

(22) Filed: Oct. 29, 2009

(65) Prior Publication Data

US 2010/0148546 A1    Jun. 17, 2010

(30) Foreign Application Priority Data

Dec. 17, 2008 (EP) .................... 08425798

(51) Int. Cl.
*A47C 7/46* (2006.01)
(52) U.S. Cl. ........... 297/284.4; 297/284.7; 297/284.8; 297/284.1
(58) Field of Classification Search ............ 297/284.4, 297/284.7, 284.8, 284.1
See application file for complete search history.

(56) References Cited

U.S. PATENT DOCUMENTS

| | | | | |
|---|---|---|---|---|
| 5,076,643 A * | 12/1991 | Colasanti et al. | ........... | 297/284.6 |
| 5,344,211 A * | 9/1994 | Adat et al. | ............... | 297/230.14 |
| 5,651,583 A * | 7/1997 | Klingler et al. | ............ | 297/284.4 |
| 5,954,399 A * | 9/1999 | Hong | .......................... | 297/284.4 |
| 6,045,185 A * | 4/2000 | Ligon et al. | ................ | 297/284.4 |
| 6,270,158 B1 | 8/2001 | Hong | .......................... | 297/284.4 |
| 6,402,246 B1 * | 6/2002 | Mundell | ...................... | 297/284.4 |
| 6,644,740 B2 * | 11/2003 | Holst et al. | .................. | 297/284.4 |
| 6,779,844 B2 * | 8/2004 | Dosen et al. | ............... | 297/284.4 |
| 6,918,634 B2 * | 7/2005 | Elliot | ......................... | 297/284.4 |
| 7,360,836 B2 * | 4/2008 | Schwarzbich et al. | ..... | 297/284.4 |
| 7,984,949 B2 * | 7/2011 | McMillen et al. | ......... | 297/284.9 |
| 7,997,650 B2 * | 8/2011 | McMillen et al. | ......... | 297/284.4 |
| 8,038,215 B2 * | 10/2011 | Di Giusto et al. | .......... | 297/284.1 |
| 8,070,223 B2 * | 12/2011 | Omori et al. | ............. | 297/216.12 |
| 2003/0006635 A1 * | 1/2003 | Klingler | ..................... | 297/284.4 |
| 2004/0075312 A1 * | 4/2004 | Neale | ....................... | 297/216.12 |
| 2005/0017555 A1 * | 1/2005 | Elliot | ........................ | 297/284.4 |
| 2006/0178603 A1 * | 8/2006 | Popescu | ......................... | 601/93 |
| 2006/0261653 A1 * | 11/2006 | McMillen et al. | ......... | 297/284.4 |
| 2007/0063561 A1 * | 3/2007 | McMillen | ................. | 297/284.8 |
| 2007/0158985 A1 * | 7/2007 | Mundell et al. | ........... | 297/284.2 |
| 2007/0228789 A1 * | 10/2007 | McMillen | ................. | 297/284.4 |
| 2007/0236062 A1 * | 10/2007 | McMillen et al. | ......... | 297/284.4 |
| 2008/0217978 A1 * | 9/2008 | Stossel et al. | ............... | 297/284.4 |
| 2010/0066136 A1 * | 3/2010 | D'Agostini | ............. | 297/216.12 |
| 2010/0078974 A1 * | 4/2010 | Nathan | ....................... | 297/217.3 |

OTHER PUBLICATIONS

European Search Report mailed Apr. 17, 2009 in corresponding European Patent Application No. 08425798.9.

* cited by examiner

*Primary Examiner* — Laurie Cranmer
(74) *Attorney, Agent, or Firm* — Ostrolenk Faber LLP

(57) ABSTRACT

A lumbar support for a vehicle backrest has a resting element with a front surface shaped for supporting an area of the back of a user; the resting element is connected to a frame of the backrest via elastic elements, which are bistable for allowing the resting element to click from an advanced position to a rearward position when a thrust against the front surface exceeds a given threshold.

20 Claims, 5 Drawing Sheets

LUMBAR SUPPORT FOR A VEHICLE BACKREST

FIELD OF THE INVENTION

The present invention relates to a lumbar support for a vehicle backrest.

BACKGROUND OF THE INVENTION

In order to render the seats of motor vehicles comfortable, it is known to provide a lumbar support, i.e., a device placed within the backrest and comprising a resting element that is coupled to a frame of the backrest and that defines a shaped front surface placed at the height of the lumbosacral area of the body of the person occupying the seat. In general, the lumbar support also comprises an adjustment device, which is actuatable by the user for adapting the shape and/or position of the resting element according to the anatomical conformation of his own body and/or to requirements of personal comfort.

There is then known the tendency to provide lumbar supports that contribute to the safety of the person occupying the seat in the case of an accident with rear impact against the motor vehicle. This type of lumbar supports comprises a resting element that is able to undergo displacement backwards in the case of an accident with rear impact so as to allow the body of the user to approach the headrest of the seat in order to limit the so-called "whiplash" phenomenon. In this context, there is a long felt unmet need to provide a lumbar support that will be extremely simple and will have a small number of components.

SUMMARY OF THE INVENTION

The aim of the present invention is to provide a lumbar support for a vehicle backrest, which realizes the objectives set forth above in a simple and inexpensive way.

According to the present invention, a lumbar support for a vehicle backrest is provided which includes a resting element having a front surface shaped for supporting an area of the back of a user, with fasteners configured to enable connecting the resting element to a frame of the vehicle backrest. The fasteners comprise elastic elements which are bistable and which allow the resting element to click from an advanced position to a rearward position when a thrust against the front surface exceeds a given threshold. The elastic elements can be formed as one or more leaf springs and may be formed as two vertically spaced, and horizontally extending bands. An adjustment device can be provided which enables varying the shape and/or the position of the front surface and which is actuatable by the user through a transmission device actuated by the user.

The lumbar resting element can be formed of a plate made of a single piece and have a reference portion fixed to the elastic members. A strap which is slidable with respect to the reference portion and which is coupled to the deformable portion via a hinge, may also be provided.

BRIEF DESCRIPTION OF THE DRAWINGS

For a better understanding of the present invention a preferred embodiment is now described, purely by way of non-limiting example, with reference to the attached drawings, wherein.

DETAILED DESCRIPTION OF THE INVENTION

Figure 1:
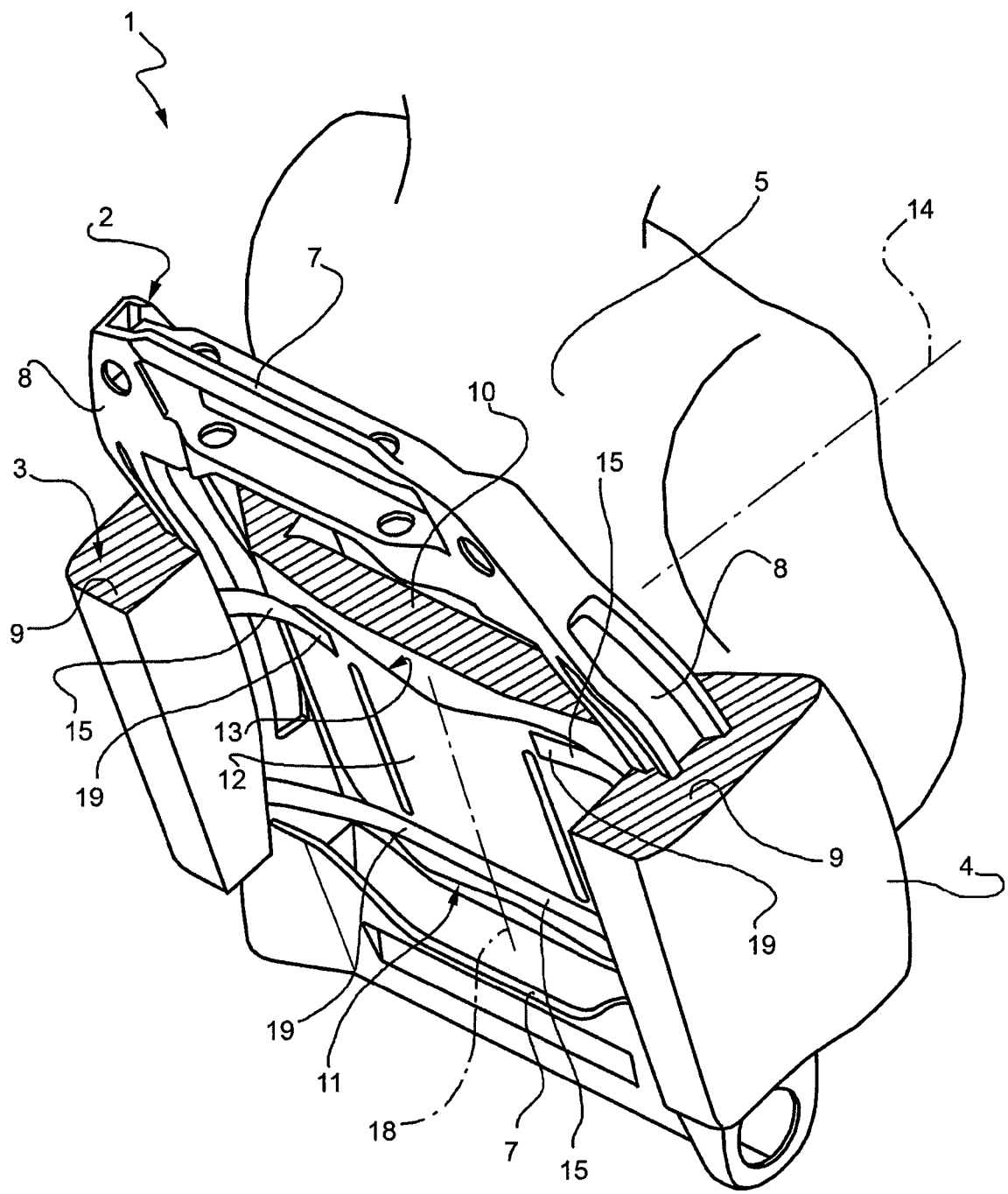
FIG. 1 is a rear perspective view of a preferred embodiment of the lumbar support for a vehicle backrest according to the present invention.

In FIG. 1, a backrest 1 of a seat for vehicles (partially illustrated) comprises a frame 2, which is coupled to a sitting surface of the seat (not illustrated) and bears a headrest (not illustrated).

The backrest 1, moreover, comprises a padding 3 (partially illustrated) and an outer coating 4, which is defined by a fabric that covers the padding 3 and defines a resting surface for the back 5 of a user.

The frame 2 comprises two substantially horizontal cross members 7 and two side uprights 8. The padding 3 comprises two side portions 9, which partially house the uprights 8, and an intermediate portion 10, which extends between the portions 9 and is associated to a lumbar support placed in a low position, i.e., at the height of the lumbosacral area of the user's back 5.

The lumbar support 11 comprises a resting element 12 having a front surface 13 shaped for supporting the lumbosacral area of the back 5 in a direct or indirect way. In particular, the resting element 12 is defined by a plate made of a single piece of plastic material and placed behind the portion 10.

The resting element 12 is coupled to the frame 2 via elastic connection elements 15 of a bistable type, which enable the resting element 12 to undergo displacement from an advanced position to a rearward position in a longitudinal direction 14 of advance of the vehicle in the case of an accident with rear impact, so as to allow the user's back 5 to move backwards under the inertial thrust of the user and, hence, allow the head of the user to approach the headrest to prevent whiplash phenomena.

By the term "bistable," it is meant that the shape, dimensions, and/or materials, with which the elements 15 are produced, enable the elements 15 to set themselves in a first position or else a second position of stable equilibrium, which correspond, respectively, to the advanced position and to the rearward position of the resting element 12. The elements 15 click between the first position and the second position of equilibrium when a given threshold of stress is exceeded. In other words, in normal conditions of advance of the vehicle, the elements 15 are set in their first position of equilibrium and behave like a normal supporting spring so that the resting element 12 tends to return elastically always into its advanced position when the surface 13 is pushed by the user's back 5 up to the aforesaid threshold. On the other hand, when the thrust of inertia against the surface 13 exceeds said threshold in the case of rear impact on the vehicle, the elements 15 click into their second position of equilibrium, and, hence, the resting element 12 sets itself almost instantaneously in its rearward position.

In particular, the elements 15 define two bands, which connect the resting element 12 to the uprights 8, are substantially horizontal, and are placed at a distance from one another in a direction 18 that coincides substantially with the center-line axis of the backrest 1. In particular, each band is defined by a single continuous leaf spring or else by a pair of leaf springs placed at distances apart and aligned horizontally.

Figure 3:
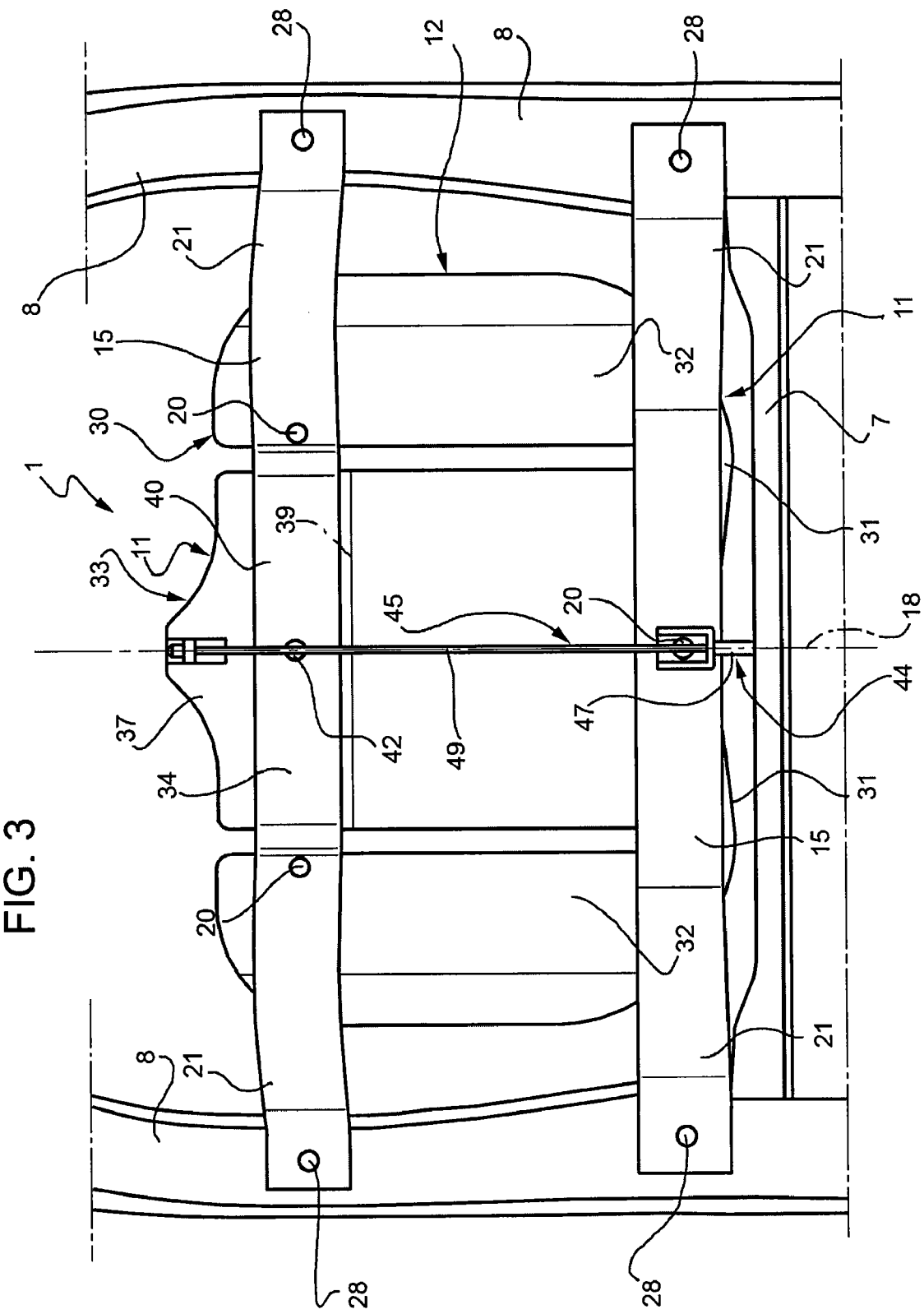
FIG. 3 is a rear view of a first variant of the lumbar support of FIG. 1.
Figure 4:
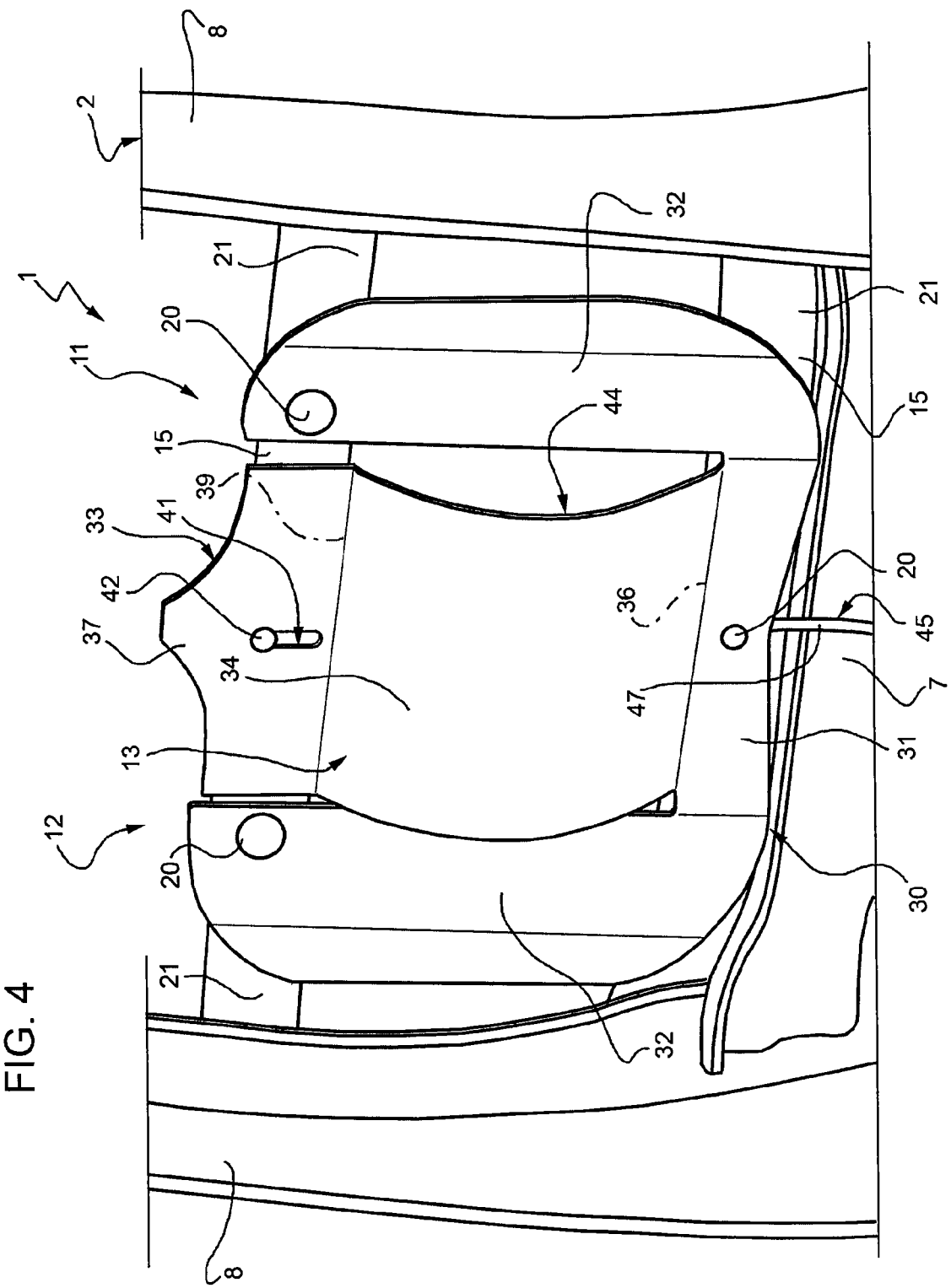
FIG. 4 is a front view of the lumbar support of FIG. 3, set in a different operating configuration.

The leaf springs 15 are made of metal material or else plastic material and comprise respective connection portions 19, which are placed behind the resting element 12 and are fixed to the resting element 12 itself, for example, via rivets (designated by the reference number 20 in the variant of FIGS. 3 and 4).

Figure 2:
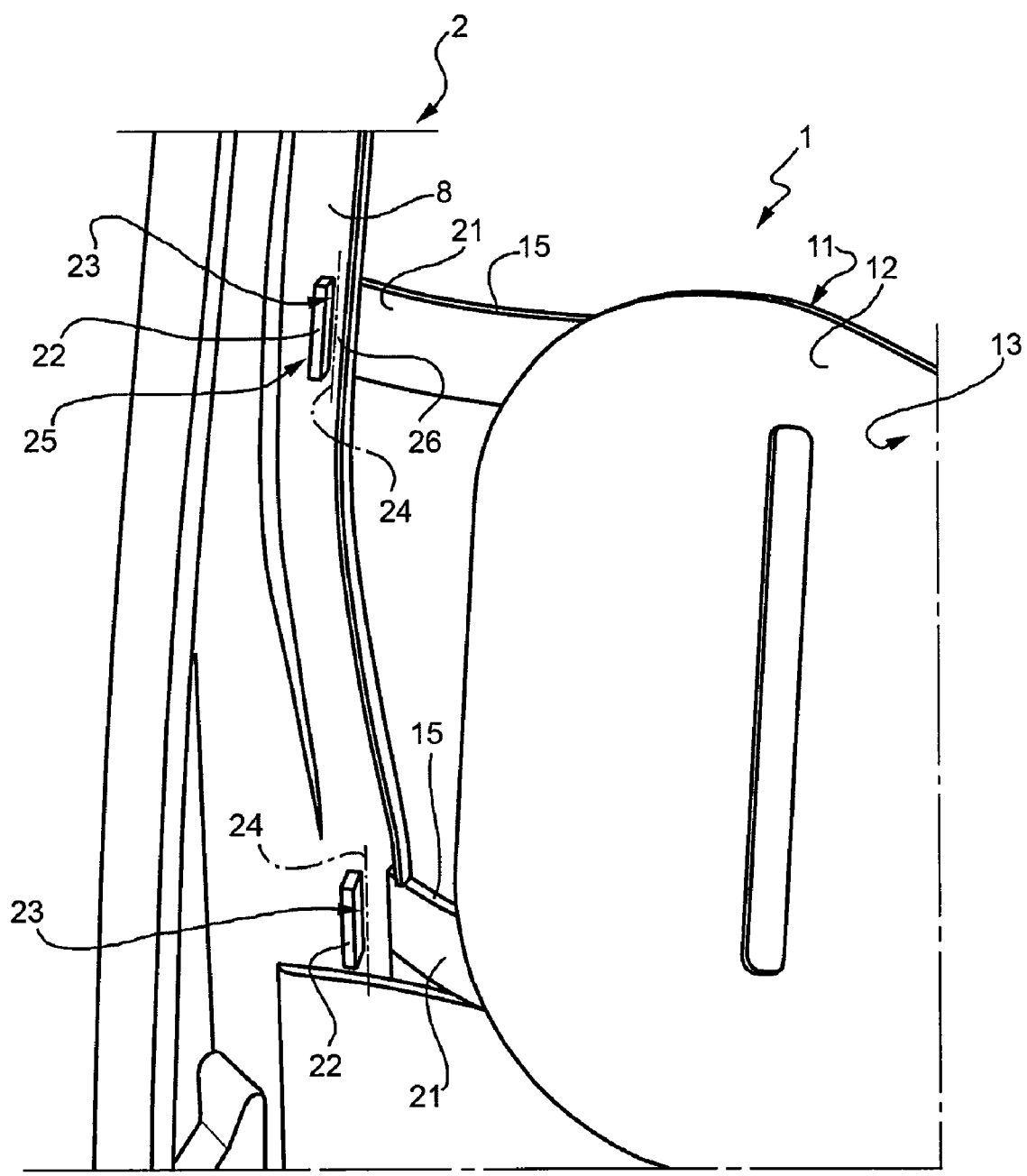
FIG. 2 illustrates from the front, at an enlarged scale and with parts removed for clarity, a detail of the lumbar support of FIG. 1.

With reference to FIG. 2, the leaf springs 15 comprise respective side portions 21 having a concavity that changes when they click between the first position and the second position of equilibrium. In particular, the concavity of the portions 21, in plan view, in the first position of equilibrium faces backwards and in the second position of equilibrium faces forwards. The portions 21 pass between the portions 9 of the padding 3 and the uprights 8 and have respective ends 22 that are bent forwards, engage respective holes 23 of the uprights 8, and project at the front from the holes 23.

The coupling via the holes 23 enables the portions 21 to turn about hinge axes 24 substantially parallel to the direction 18, to allow greater freedom for the leaf springs to click backwards towards the second position of equilibrium. The ends 22 are withheld in coupling to the uprights 8 so as not to slide out of the holes 23. For example, retention clips (not illustrated) are coupled to the ends 22 and are set bearing upon the front surface 25 of the uprights 8. Alternatively, for example, the ends 22 are bent like an eyelet inwards in a way not illustrated, so as to close, each around a corresponding edge portion 26 of the upright 8.

FIGS. 3 and 4 show a variant of the lumbar support 11, the constituent parts of which are designated, where possible, by the same reference numbers as the ones used in FIGS. 1 and 2.

In said variant, the portions 21 are without bent ends and are fixed to the portions 9 via respective rivets 28 or else self-tapping screws.

Furthermore, the resting element 12 comprises a peripheral reference portion 30, which is substantially U-shaped, is fixed to the portions 19, in particular via rivets 20, and comprises a base 31 and two tabs 32 that project upwards from the base 31. The resting element 12 moreover comprises a portion 33, which is placed between the tabs 32 and is deformable or movable with respect to the portion 30 in response to manual actuation of a control member (not illustrated) placed alongside the backrest 1.

In particular, the portion 33 is made of a single piece with the base 31 and comprises an elastically deformable band 34, which defines the surface 13 and is coupled to the base 31 via a flexible or weakened portion defining a virtual hinge with axis 36 of rotation orthogonal to the directions 14 and 18. The portion 33 moreover comprises a upper strap 37, which is coupled to the band 34 via a flexible or weakened portion defining a virtual hinge with axis 39 of rotation parallel to the axis 36. The strap 37 rests on a central portion 40 of the upper leaf spring 15 so as to discharge backwards the thrust exerted in use by the user's back 5 on the band 34, and has a slot 41, which is parallel to the direction 18 and is engaged in a slidable way by a pin or rivet 42. The rivet 42 is fixed to the portion 40 and projects forwards from the portion 40 with a shape so as to guide and withhold the strap 37 resting on the portion 40.

The portion 33 and the control member mentioned above form part of an adjustment device 44, which can be actuated by the user for deforming the band 34 and improving the comfort for resting of the lumbosacral area of his back 5. The device 44 comprises a transmission 45, which connects the control member to the strap 37 and comprises a Bowden cable. With reference to FIG. 3, the Bowden cable in turn comprises a sheath 47 having one end fixed to the base 31, and a core 49, which is slidable in the sheath 47, extends in the direction 18 behind the portion 40, and has one end fixed to the strap 37.

By pulling the core 49 with respect to the sheath 47 via the control member, the strap 37 translates in the direction 18 downwards under the guidance of the pin 42 and brings about deformation of the band 34, which curves forwards so as to have a concavity facing backwards and so as to support with greater stiffness, and possibly push forwards, the portion 10 of the padding 3. Obviously, the deformation of the band 34 is all the higher, the higher the travel of sliding downwards of the strap 37.

Figure 5:
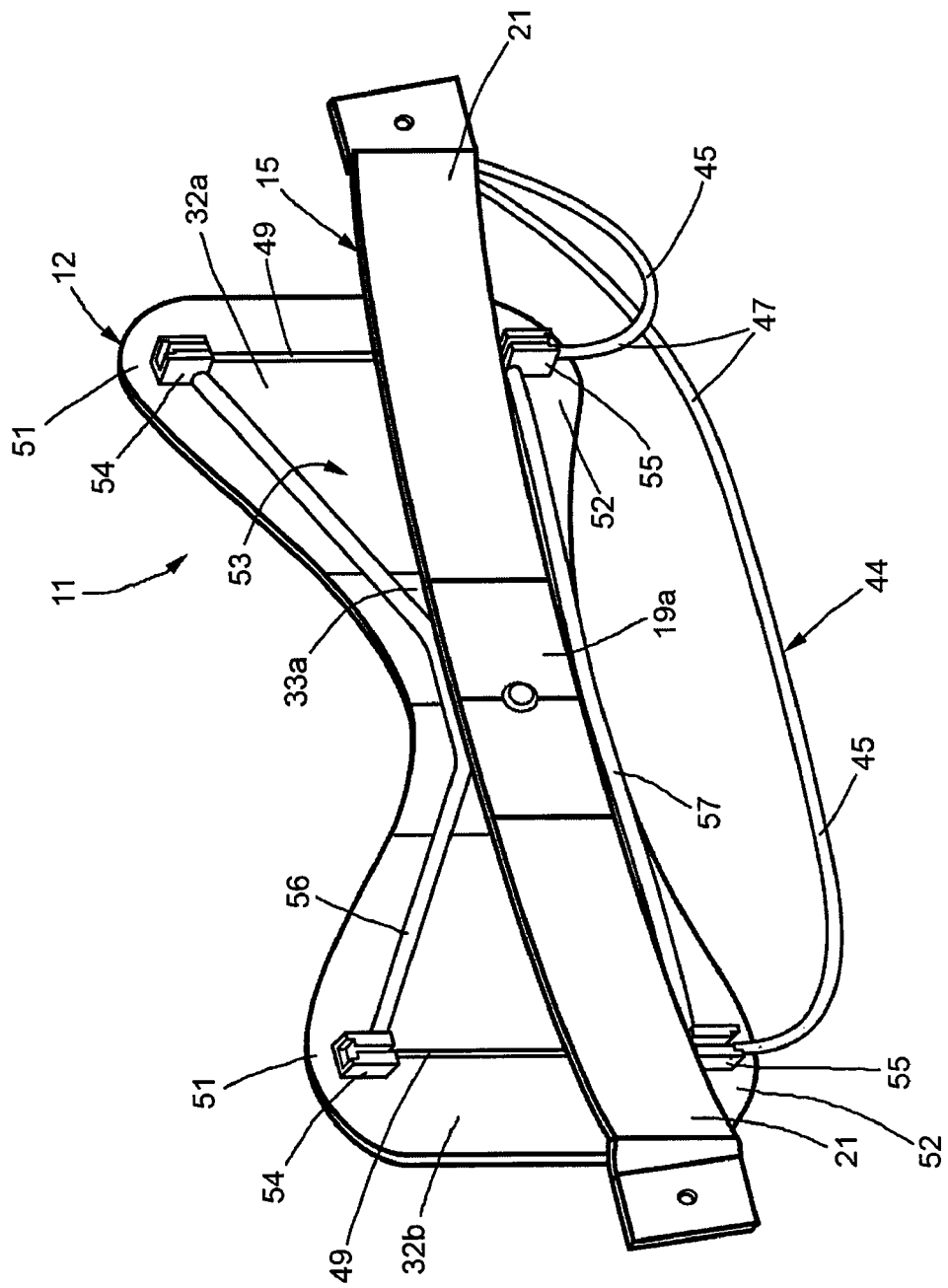
FIG. 5 is a rear perspective view of a second variant of the lumbar support of FIG. 1.

FIG. 5 shows a further variant of the lumbar support 11, the constituent parts of which are designated, where possible, by the same reference numbers as those used in FIGS. 3 and 4. In this case, the lumbar support 11 comprises a single horizontal band, in turn defined by a single bistable leaf spring 15. Furthermore, the resting element 12 comprises an intermediate portion 33a fixed to a central portion 19a of the leaf spring 15, and two side tabs 32a, 32b, which have a height greater than the portion 33a and project upwards and downwards with respect to the portion 33a with upper lobes 51 and lower lobes 52. Each of the tabs 32a, 32b is flexible so that the lobe 51 and the lobe 52 can be brought closer to one another under the action of the adjustment device 44 and thus form a front convexity. In particular, the device 44 comprises two Bowden-cable transmissions 45, which connect the control member to the rear surface 53 of the resting element 12. The lower lobes 52 are fixed to the ends of the sheaths 47, while the upper lobes 51 are fixed to the ends of the cores 49 of the Bowden cable. Consequently, the cores 49 pass vertically into the spaces behind the tabs 32a, 32b and in front of the portions 21 of the leaf spring 15.

Preferably, the ends of the cores 49 and of the sheaths 47 are coupled to the lobes 51 and 52 via engagement elements 54 and 55, respectively, which are made of plastic material in a single piece with the resting element 12 and project from the surface 53. Furthermore, two stiffening ribbings 56, 57 are provided on the surface 53 to hinder bending of the tabs 32a, 32b about vertical axes. The ribbings 56, 57 are also made of plastic material in a single piece with the resting element 12, are placed above and, respectively, below the leaf spring 15, are arched with their concavities facing upwards and downwards, respectively, and join the elements 54 and 55, respectively, to one another.

It is evident that by pulling the cores 49 with respect to the sheaths 47 via the control member, the lobes 51 and 52 approach one another vertically so that the tabs 32a, 32b undergo deformation, curving forwards, so as to support the portion 10 of the padding 3 with a greater degree of stiffness.

Alternatively, there could be provided a single transmission 45, with a core 49 that forms a path that is U-shaped or else has the shape of a U set upside down between the elements 54, 55.

Moreover, the shape of the ribbings 56, 57 can be varied in the perspective of optimizing the support of the back of the occupant and the comfort of the seat.

As mentioned above, in the case of rear impact on the vehicle, the longitudinal thrust of inertia of the back 5 of the user against the portion 10 is transmitted to the resting element 12 and by the latter onto the leaf springs 15. When said thrust exceeds the stress threshold for which the leaf springs 15 have been designed, the leaf springs 15 click into the second position of equilibrium, enabling the resting element 12 to move into its rearward position almost instantaneously with a longitudinal travel of a few centimeters. Owing to this recession, the user's head approaches the headrest so that the whiplash phenomena are limited.

After the accident, it is possible to bring the lumbar support 11 back into the initial conditions, i.e., to bring the leaf springs 15 back into their first position of equilibrium, by exerting a thrust forward on the rear surface of the backrest 1, in a position corresponding to the resting element 12, via appropriate tools (not illustrated).

From the foregoing, it emerges clearly how the lumbar support 11 has an extremely small number of components insofar as the elastic elements 15 perform both the function of connection of the resting element 12 to the frame 2 and the function of elastic support in normal conditions of travel of the vehicle, as well as the anti-whiplash safety function in the case of an accident with rear impact.

The components of the lumbar support 11 are relatively simple to assemble. At the same time, the lumbar support 11 is easy to install on the frame 2, and the machining operations required for adapting the frame 2 to the lumbar support 11 (for example, formation of the holes 23) are few in number and are relatively simple.

Furthermore, during an accident with bumping of the vehicle, the lumbar support 11 is not damaged and can be brought back into the initial operating configuration, where the resting element 12 is placed in an advanced position, without costly interventions of repair.

Finally, it is clear that modifications and variations can be made to the lumbar support 11 described and illustrated herein, without thereby departing from the scope of protection of the present invention.

For example, the shape and dimensions of the resting element 12 could be different from the ones illustrated, for instance, for supporting also the scapular area of the back 5 and not just the lumbosacral area, and/or the resting element could be made up of various pieces, instead of being defined by a plate made of a single piece, and/or the device could be different from the one described by way of example with reference to FIGS. 3 and 4.

Furthermore, the lumbar support 11 could be connected to the cross members 7, in combination with or as an alternative to coupling to the uprights 8, and/or there could be provided a slight freedom of movement also in the coupling between the elastic elements 15 and the resting element 12.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A lumbar support for a vehicle backrest, the lumbar support comprising:
    a resting element having a front surface shaped for supporting an area of the back of a user; and
    fasteners configured to enable connecting said resting element to a frame of said backrest; said fasteners comprising elastic elements;
    wherein said elastic elements are bistable for allowing said resting element to click from an advanced position to a rearward position when a thrust against said front surface exceeds a given threshold.

2. The lumbar support according to claim 1, wherein said elastic elements comprise at least one leaf spring.

3. The lumbar support according to claim 2, wherein said leaf spring comprises a central connection portion fixed to an intermediate portion of said resting element.

4. The lumbar support according to claim 2, wherein the at least one leaf spring is formed of a spring material selected from the group including metals and plastic materials.

5. The lumbar support according to claim 2, wherein the advanced position is positioned so as to urge the resting element more forcefully against the back of the user.

6. The lumbar support according to claim 2, wherein said leaf spring comprises a central connection portion fixed to a rear surface of said resting element.

7. The lumbar support according to claim 1, wherein said elastic elements define two bands, which are substantially horizontal and are placed at a distance from one another in a direction that coincides substantially with a center-line axis of the lumbar support.

8. The lumbar support according to claim 1, comprising an adjustment device enabling varying the shape and/or position of said front surface; said adjustment device comprising a deformable portion of said resting element, a control member actuatable by a user, and a transmission for deforming said deformable portion in response to actuation of said control member.

9. The lumbar support according to claim 8, wherein said resting element comprises:
    an intermediate portion fixed to said elastic elements; and
    two side tabs defining said deformable portion.

10. The lumbar support according to claim 9, wherein each of said side tabs comprises a corresponding upper terminal lobe and a corresponding lower terminal lobe, which can be brought up closer to one another vertically via said transmission.

11. The lumbar support according to claim 8, wherein said resting element comprises:
    a reference portion fixed to said elastic elements; and
    a strap, which is slidable with respect to said reference portion in a direction that coincides substantially with a center-line axis of the lumbar support and is coupled to said deformable portion via a hinge with an axis orthogonal to said direction.

12. The lumbar support according to claim 1, wherein said resting element is defined by a plate made of a single piece; said deformable portion being coupled to said reference portion and to said strap via respective flexible or weakened portions defining virtual hinges.

13. The lumbar support according to claim 11, wherein said strap rests on a supporting portion forming part of one between said elastic elements, and by comprising guides that couple said strap to said resting portion.

14. An apparatus including the lumbar support of claim 1, in combination with and coupled to a seat backrest for a vehicle, wherein the seat backrest includes a frame.

15. The apparatus of claim 14, wherein said bistable elastic elements comprise respective side portions fixed to said frame via rivets.

16. The apparatus of claim 14, wherein said bistable elastic elements comprise respective side portions coupled to said frame so as to present freedom of rotation.

17. The apparatus of claim 16, wherein said side portions extend behind said frame and have their own ends that engage respective holes of said frame.

18. The lumbar support according to claim 1, wherein the elastic elements comprises a single, unitary leaf spring formed as a single horizontal band with a central section which is configured to move between the advanced position and the rearward position.

19. The lumbar support according to claim 1, wherein resting element is positioned for supporting a scapular area of the back of the user.

20. The lumbar support according to claim 1, wherein resting element is positioned for supporting a lumbosacral area of the back of the user.

* * * * *